ELECTRONIC ACCUMULATOR

Filed Sept. 19, 1952 5 Sheets-Sheet 1

INVENTORS:
ROBERT T. BLAKELY
DORVAL C. SPRONG
BY
D. C. Snyder
K. W. Wonnell
ATT'YS

*INVENTORS:*
ROBERT T. BLAKELY
DORVAL C. SPRONG
BY D. C. Snyder
K. W. Wommell
ATT'YS June 30, 1959 R. T. BLAKELY ET AL 2,892,589

ELECTRONIC ACCUMULATOR

Filed Sept. 19, 1952 5 Sheets-Sheet 3

*INVENTORS:*
ROBERT T. BLAKELY
DORVAL C. SPRONG
BY D. C. Snyder
K. W. Wommell
ATT'YS INVENTORS:
ROBERT T. BLAKELY
DORVAL C. SPRONG
BY D. G. Snyder
K. W. Wonnell
ATT'YS

ELECTRONIC ACCUMULATOR

*INVENTORS:*
ROBERT T. BLAKELY
DORVAL C. SPRONG
BY D. C. Snyder
K. W. Wornell
ATT'YS United States Patent Office 2,892,589

Patented June 30, 1959

2,892,589

ELECTRONIC ACCUMULATOR

Robert T. Blakely, Poughkeepsie, N.Y., and Dorval C. Sprong, Long Beach, Calif.

Application September 19, 1952, Serial No. 310,572

3 Claims. (Cl. 235—173)

(Granted under Title 35, U.S. Code (1952), sec. 266)

This invention relates to an electronic cumulating device, and the principal object thereof is to provide an improved electronic accumulator which is simpler and faster acting than existing devices of a similar type such as the device disclosed in U.S. Patent 2,442,428.

More specifically, the object of this invention is to provide a novel and improved electronic accumulator which provides for both subtraction and addition of numbers in a decade counter system where carry-over is accomplished without substantially affecting the speed of the device.

Still another object of the invention is to provide an electrical computing device which will add or subtract digits of different denominations (i.e., tens, hundreds, thousands, etc.) at the same time in their different denominational banks.

A further object of the invention is to provide an electrical pulse counter which provides for carry-over from one denomination to another without interfering with the regular count pulses.

There are numerous electronic accumulators in the prior art, one example of which is disclosed in U.S. Patent 2,442,428 granted to R. E. Mumma on June 1, 1948. The invention is an improvement thereon; for example, the digits of different denominations (tens, hundreds, thousands, etc.) may be simultaneously added rather than sequentially added as is the case with the device in the latter patent. The invention includes other improvements and advantages which will later become apparent.

The function of the electronic accumulator comprising the invention is to accumulate totals from high speed equipment at a high rate of speed. In effect it is a high speed adding machine. It is possible to make over 200 entries per second with totals instantly available.

The accumulator consists of a time base (square wave) signal generator, necessary power supplies and the units called "columns." These columns are the units that actually accumulate the totals. The number of columns used determine the total capacity of the unit. That is, if six columns are used the capacity of the unit will be 999,999, etc. Inasmuch as these columns are identical and interchangeable, a description of the operation of one column will suffice to explain the operation of the entire unit.

Other advantages, objects and features of the invention will become more clear and apparent upon making reference to the description to follow and the drawings wherein.

Figure 1:
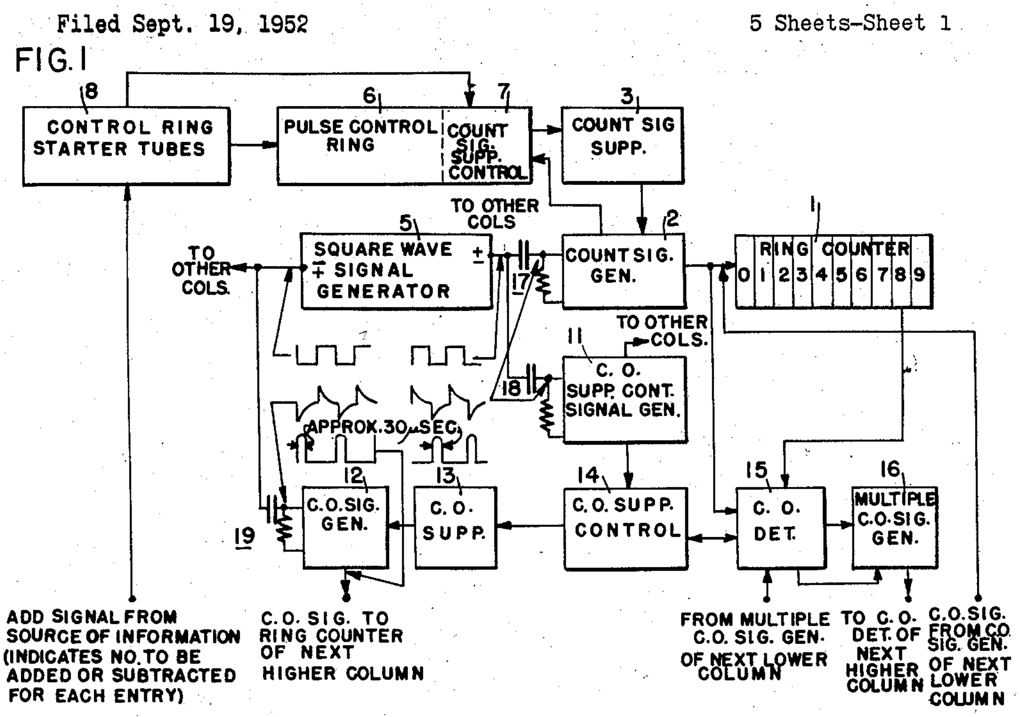
Figure 1 is a block diagram of the elements found in one column of the device in this invention.
Figure 6:
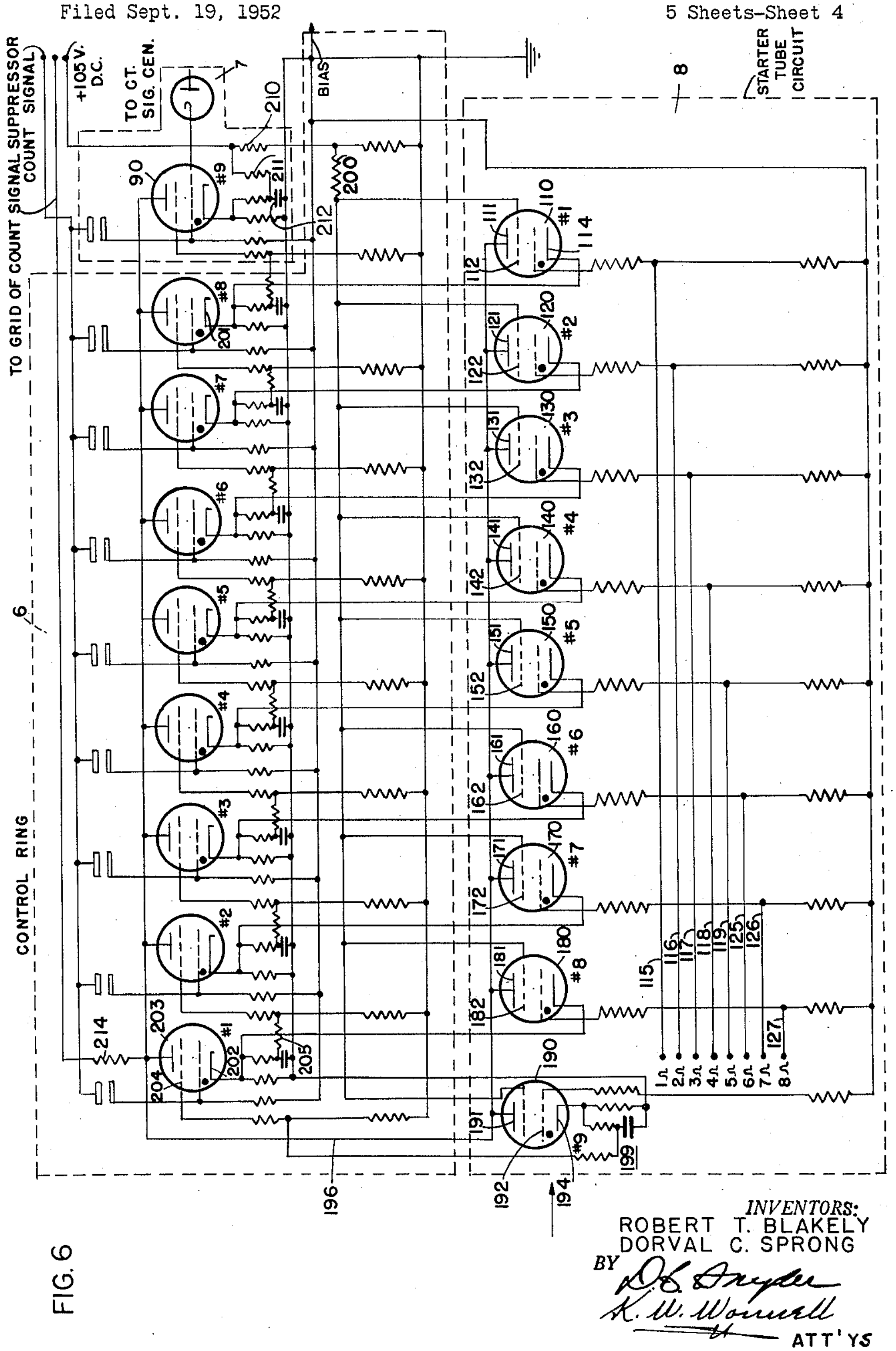
Figure 6 is an exemplary schematic diagram of the control ring starter tubes and the pulse control ring shown in block form in Figure 1.

Reference to the functional block diagram of Figure 1 and the circuit diagram of Figure 6 will assist in understanding the description which immediately follows.

The basic unit is a ring counter 1 which may be composed of ten type 2D21 gas tetrodes (not shown in Figure 1). There is one of these units (plus auxiliary tubes and circuits) for each column of figures corresponding to the units, tens, hundreds, etc., columns of the ordinary adding machine. Only one of these ten tubes is fired at any one time. Adding a number to a column results in the tube corresponding to the next higher number firing and extinguishing the tube that was previously fired. If this number is added in the units column, 1 is added to the total already indicated. If added to the tens column 10 is, of course, added to the indicated total, etc.

The counter is operated by pulses which are supplied by a tube known as the count signal generator 2 to be described later. These pulses are applied simultaneously to the grids of all the ring counter tubes and are of sufficient amplitude to fire any tube whose screen is near its cathode potential. Its duration is very short, approximately 30 microseconds.

The screens of all the tubes except the one immediately following the one actually fired are kept at a potential of approximately 40 volts negative with respect to their cathodes. In this way the only tube that can fire is the one corresponding to the next higher number. When this tube fires it extinguishes the tube previously fired and prepares the screen of the next tube so that it can fire when the next pulse comes from the count signal generator or, as will be seen later, when a signal is received from a carry-over signal generator 12 of the next lower order column.

Just so long as the count signal generator 2 continues to send out pulses the ring counter tubes 1 keep firing in succession and in the order $\phi$, 1, 2, 3, 4, 5, 6, 7, 8, 9, $\phi$, etc. The count signal generator 2, however, cannot operate so long as the count signal suppressor 3 is operative.

The count signal generator 2 is operated by a continuous square wave signal supplied by a conventional type square wave signal generator 5. Although the count signal generator 2, itself, operates continuously, the count signal suppressor 3, when operative, limits the amplitude of the signals to a value insufficient to operate any of the circuits fed by the count signal generator 2. The function of the count signal suppressor 3, then, is to effectively render the count signal generator 2 inoperative.

The count signal suppressor 3 is controlled by the count signal suppressor control tube 7. The count signal suppressor control tube 7 is, in reality, the last tube of a pulse control ring 6 but is given a separate functional name in order to facilitate description.

The pulse control ring 6, together with the count signal suppressor control 7, comprise a ring which operates in exactly the same manner as the main ring counter 1 except that operation ceases as soon as the last tube 7 (the count signal suppressor control) is fired. That is, the last tube 7 does not prime the screen of any other tube, except the counter ring starter tubes 8 to be discussed later. So long as the count signal suppressor control 7 is fired, the count signal suppressor 3 is operative, preventing operation of the count signal generator 2.

The pulse control ring 6 (shown in detail in Figure 6) as well as the count signal suppressor control 7 operate from signals from the count signal generator 2 simultaneously with the main ring counter 1 and in exactly the same manner.

The control ring starter tubes 8 (also shown in Figure 6) are nine in number corresponding to the digits 1 through 9. Any one of these tubes, when fired, extinguishes the count signal suppressor control 7 and primes the screen of the corresponding tube of the pulse control ring 6 (or the screen of the count signal suppressor control 7) so that it can fire when the count signal generator 2 operates, which it may now do, inasmuch as the count signal suppressor 3 has been rendered inoperative at the time the count signal suppressor control 7 was extinguished.

As soon as the proper tube of the pulse control ring 6 (determined by which of the control ring starter tubes was fired) fires the control ring starter tube previously fired is extinguished and the screen of the following tube of the pulse control ring is primed so that the next pulse from the count signal generator 2 can fire it. Note that the pulse control ring 6 and the main ring counter 1 each advance one step simultaneously each time a pulse is sent out from the count signal generator 2. Also it should be noted that, once the count signal suppressor control 7 has been extinguished, the screens of all the control ring starter tubes 8 are driven negative so that they cannot be fired nor refired until the count signal suppressor control 7 is again fired.

Now, if the tube corresponding to the digit 1 of the control ring starter tubes 8 is fired the count signal suppressor control 7 is extinguished (rendering the count signal suppressor 3 inoperative) and the screen of the count signal suppressor control 7 is primed so that the first pulse from the count signal generator 2 fires it and also advances the main ring counter 1 one position. Also the screens of the control ring starter tubes 8 are driven about 40 volts negative. The count signal suppressor control 7, when it refires, extinguishes the #1 control ring starter tube and causes the count signal suppressor 3 to again become operative, preventing more pulses from the count signal generator. We have, therefore, added one, and only one, to the total already on that particular column.

Suppose we wish to add two to the column. We would fire the #2 control ring starter tube which would operate as for the #1 tube except that, instead of priming the screen of the count signal suppressor control 7, it would prime the pulse control ring tube (#8) before it. The first pulse from the count signal generator 2 would fire #8 pulse control ring tube and advance the main ring counter one position.

The #8 pulse control ring tube, when fired, would extinguish the #2 control ring starter tube and prime the screen of the count signal suppressor control 7. The next pulse would fire the count signal suppressor control 7 which would extinguish the #8 pulse control ring tube, reprime the screens of the control ring starter tubes 8 and operate the count signal suppressor 3. The pulse would also advance the main ring counter 1 one more position. The count signal suppressor 3, now operative, prevents further pulses from the count signal generator 2. We have added two, and two only, to the column.

If we fire the #9 control ring starter tube the same sequence of events takes place except that we start with the first pulse control ring tube and it requires a total of nine pulses from the count signal generator to fire the eight pulse control ring tubes 6 in succession plus the count signal suppressor control 7. This results in nine being added to the total on that column.

Thus far a general description of the operation of a single column has been given with no regard to carry-over to or from other columns. It has been shown how the desired entry is made in any particular column by means of firing the proper control ring starter tube.

The count signal generator 2 operates from the negative excursion of the square wave voltages supplied by a square wave signal generator 5. The square wave signal generator 5 is a device which supplies two square wave voltages of opposite phase and of appropriate amplitude. The signal of one phase is applied to the several count signal generators (of which generator 2 is one) through RC differentiating circuits such as 17 which result in sharp pulses being applied simultaneously to the grids of the count signal generators. This same signal is applied also through a RC differentiating circuit 18 to the grid of the carry-over suppressor control signal generator 11. This generator 11 is, physically, included in the square wave signal generator 5 as the signal from it is common to the grids of the carry-over suppressor control tubes such as 14 (one in each column) which will be described in detail later. Its function is to provide a continuous signal in exact time phase relationship with the count signal generators 2.

The square wave of opposite phase is applied, also through differentiating circuits such as 19 to the grids of all the carry-over signal generators such as 12 (one for each column) which will be described later.

Functionally, the square wave signal generator 5 furnishes the time base upon which the timing of the various circuits depends. The useful operating frequency range of the experimental unit was from about 2 to 2500 cycles per second. The electronic accumulator was designed to operate at any frequency between these limits. The operating frequency determines the maximum number of entries possible to be made in a given amount of time.

As many cycles as there are ones in the number are required to enter a number in any column. Therefore, the maximum number of entries per second is equal to $f_0/n$ where $f_0$ is the operating frequency and $n$ is the number to enter. Therefore, at 2500 cycles it is possible to enter 278 nines per second or 1250 twos, or 2500 ones, etc.

Figure 7:
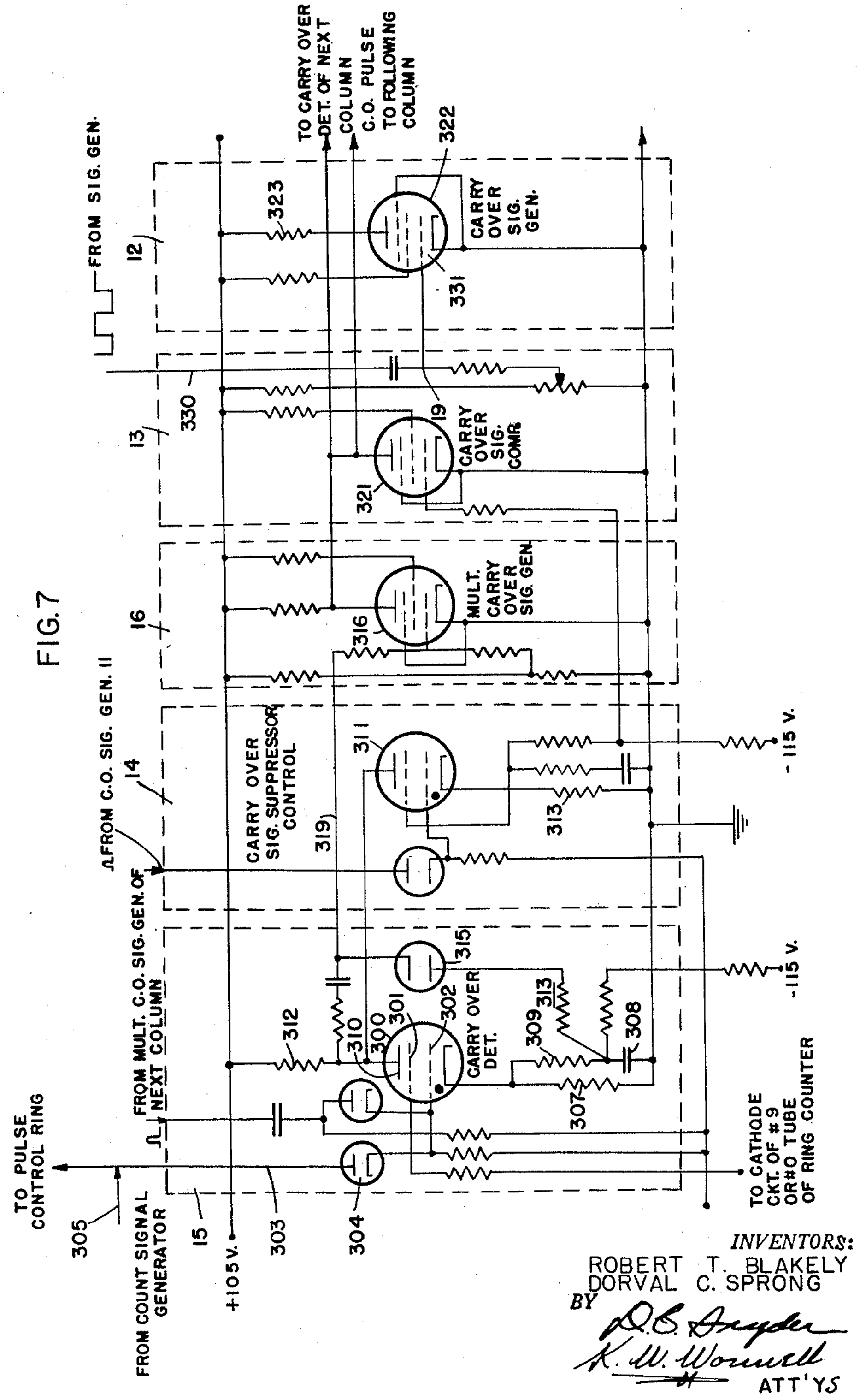
Figure 7 is an exemplary schematic diagram of the carry-over circuits shown in block form in Figure 1.

The general description to follow pertains to the carry-over features of the invention. The schematic diagram of these carry-over circuits is shown in Figure 7 and will be described in more detail in a different portion of the specification.

Each time the zero tube in any ring counter such as 1 is fired it means that some multiple of ten has been added to the column and, therefore, one should be added to the column of next higher order. For example, suppose you add 6 and 5 to the units column. The units ring counter will run up to 6 and then through zero and stop at one. As or just after the zero tube in the units column fired the ring counter of the tens column should receive a pulse to advance it one step. This operation is known as "carry-over" and should not interfere with normal entries in any column at any time.

The carry-over signal generators such as 12 operate exactly as do the count signal generators such as 2 but are supplied a signal 180 degrees out of phase with that supplied the count signal generators. In time relationship the pulses delivered by the carry-over signal generators occur half way between those delivered by the count signal generators. This allows the carry-over to be accomplished between regular count pulses and does not, therefore, interfere with them.

It should be understood that each column duplicates the elements in Figure 1 except square wave signal generator 5 (and the carry-over suppressor signal generator 11 to be described). The description to follow, as was the case above for the most part, will pertain to units which are found in each column.

The actual function of the carry-over signal generator 12 is to supply a signal to the main ring counter (not shown) of the column of next order one half cycle of the main timing signal after the zero tube has fired in the column into which a direct entry is being made.

The function of the carry-over suppressor 13 is to prevent the carry-over signal generator from operating except when a carry-over signal is desired. It is controlled by the carry-over suppressor control 14.

The carry-over suppressor control 14 may be a type 2D21 gas tetrode which is normally fired. Its grid receives continuous pulses from the carry-over suppressor control signal generator 11 which causes it to refire one cycle of the main timing signal after it has been extinguished by the carry-over detector. Its function is to control the carry-over suppressor 13.

The functions of the carry-over detector 15 are to detect when a carry-over signal should be sent to the column of the next order, to extinguish the carry-over signal suppressor control 14 and to provide a signal to operate the multiple carry-over signal generator 16, to be described later. Also its function is to limit the output of the multiple carry-over signal generator 16 to a single pulse.

The carry-over detector 15 receives a signal at its grid every time the count signal generator operates but normally its screen is biased so that the grid signal cannot fire the tube.

The number nine tube of the main ring counter 1 not only primes the screen of the zero tube but also the screen of the carry-over detector, 15. When the zero tube of the main ring counter is fired the carry-over detector 15 is also fired by the pulse fed thereto from signal generator 2, extinguishing the carry-over suppressor control 14 and sending a pulse to the multiple carry-over signal generator 16. Also, a few microseconds after firing, a suppressor signal is sent to the multiple carry-over signal generator 16 to prevent it from operating more than the one time for each carry-over. This signal lasts as long as the tube is fired.

A few microseconds after the carry-over suppressor control 14 is extinguished the carry-over suppressor 13 is rendered inoperative, making it possible for the carry-over signal generator 12 to operate.

One half cycle of the main timing pulse after the carry-over detector 15 fires the square wave signal generator 5 operates the carry-over signal generator 12 and a carry-over pulse is sent to the main ring counter of the column of next higher order, advancing it one step. (Between any count signal it may be receiving if an entry is being made in the column at that time.)

One half cycle later the carry-over suppressor control signal generator 11 sends a pulse to the carry-over suppressor control 14 which fires it. This results in the carry-over suppressor 13 becoming operative before the next signal of the carry-over signal generator 12. At the same time the carry-over detector 15 receives a quenching pulse from suppressor control circuit 14 and this pulse is also sent to the multiple carry-over signal generator 16 which cannot operate this time because the carry-over detector 15 is fired at that instant and prevents output from the multiple carry-over signal generator 16.

In the meantime when the zero tube of the ring counter 1 was fired it extinguished the #9 tube thereof and the screen of the carry-over detector 15 was again biased to cut off and cannot be fired again until after the #9 tube is again fired.

We have thus accomplished carry-over to the column of next higher order between the normal count pulses which might be present if an entry was being made in both columns simultaneously.

Now suppose that at the time we supply a count pulse to a column the #9 tubes of it and the two next higher order columns are all fired. This will mean that the screens of the carry-over detectors such as 15 of these columns will all be primed so that a signal to their grids will cause them to fire.

The pulse generated by the multiple carry-over signal generator 16 of each column is coupled to the carry-over detector grid of the column of next order. Therefore, when we fire the zero tube of the lowest order column which is "on 9," we also fire its carry-over detector which causes the multiple carry-over signal generator to send a signal to the carry-over detector of the next higher order. If this column also is "on 9" its carry-over detector will also be fired, causing a signal to be sent to the C.O. detector of the column of still next higher order causing it to fire also. This is an extremely rapid chain action continuing through as many successively high order columns as are "on 9."

In the case of the example three successive columns were "on 9" so the carry-over detector of each of these columns were fired and on the next half cycle of the main timing signal the three columns one order higher than the original three will be advanced one step each before the next count signal can appear.

As a more specific example suppose that on four columns the total indicated was 0999. One half cycle after the right column became 0 the other columns each would advance one step, giving, as a total, 1000. However, if the total on six columns was 090999, and one were added, the total would be not 101000 but 091000.

As a further example, if to this total 9 were added to the fourth order column the total would be 100000. In this case the fourth order column would run up to 9 and then zero. One half cycle later the fifth order column would advance to zero and the sixth order column would advance to 1.

The general principles of operation for addition have now been described. Following a short discussion on subtraction a detailed description of one exemplary embodiment of the invention will be made.

Subtraction is accomplished in exactly the same manner as addition except that firing a tube in the ring counter 1 primes the screen of the next lower tube instead of the next higher. Also the carry-over detector 15 is controlled by the zero tube instead of the #9 tube of the ring counter 1. This results in the ring operating in the same way only its sequence of operation is reversed.

Figure 2:
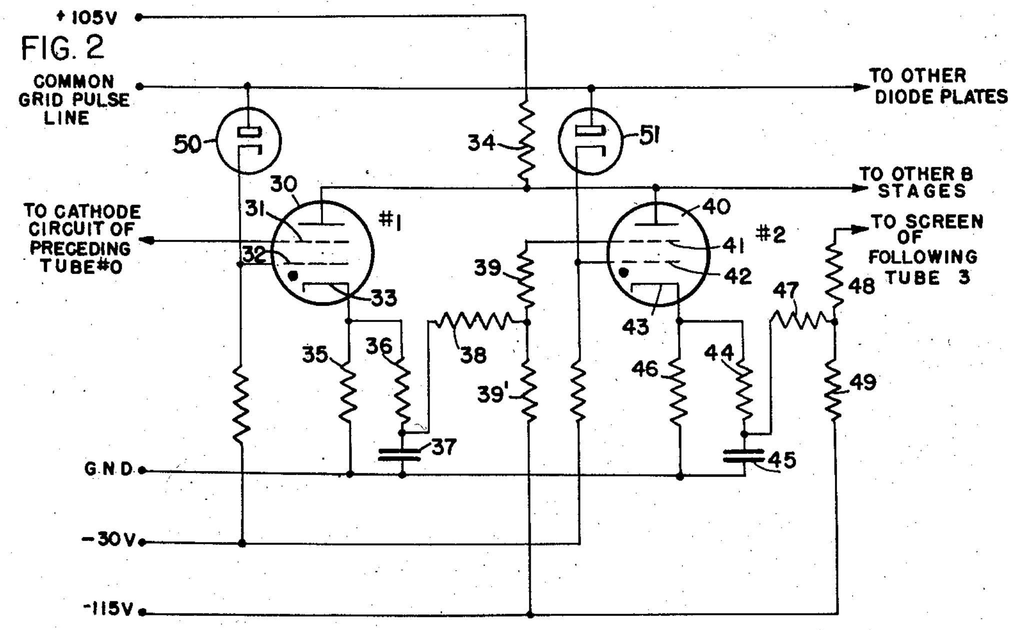
Figure 2 is an exemplary schematic diagram of the ring counter shown in block form in Figure 1.

The ring counter in Figure 2 is connected up to perform the adding operation. If the circuit is to be adopted for subtraction, then of course suitable switches must be added to the circuit there shown which will alternatively couple the screen grid circuit of each tube to either the cathode circuit of the tube to the right or to the left of it, and also to alternatively couple the cathode circuit thereof to either the tube to the right or to the left of it. Since the gas tube ring counter circuits which perform both the adding and subtracting operation in this manner are well known in the art, further description or drawings on this subject would be superfluous.

The following is a detailed description of the various units of the electronic accumulator as outlined in the general description.

This description is not intended as showing the only way in which the desired results can be obtained. As a fact there are several, some probably better. It is to show one way in which the results were accomplished.

*The ring counter*

The basic unit of the device is the ring counter. It is the ring counters that accumulate the totals and indicate them. Each ring counter accumulates the totals and indicates the correct digit for the total on the column of figures corresponding to the "degree" of the ring counter. The ring counter, proper, consists of ten type 2D21 gas tetrodes corresponding to the digits 1 through 9 and zero and necessary capacitors, resistors, etc.

Gas tubes were chosen as the indicating means because of the fact that they can be simply "fired" by a short electrical pulse and the total, indicated by which tube is fired, will remain indefinitely without need of keeping some external connection closed. They also lend themselves very readily to simple circuits which can operate at a high rate of speed.

Figure 2 is a schematic diagram showing two tubes of the ring counter. This schematic and others will be used in explaining the principle of operation.

The impedance values of the circuit may be as follows:

| | | |
|---|---|---|
| R34 | ohms | 5,000 |
| Tubes 30, 40 | | Type 2021 |
| Tubes 50, 51 | | Type 6AL5 |
| R35, 46 | ohms | 15,000 |
| R36, 44 | do | 2,500 |
| C37, 45 | mf | .001 |
| R38, 47 | ohms | 100,000 |
| R39, 49 | do | 500,000 |

The following explanation is not a rigorous analysis. Certain assumptions which do not greatly affect the accuracy are made in order to simplify understanding the general principles.

Let us assume that tube 30 (#1) is fired and sufficient time has elapsed so that all transients have subsided. Grids 32 and 42 are connected through diodes 50 and 51 respectively with the common grid pulse line which extends to all ring counters. A connection also extends from each grid through a resistance to a minus 30 v. line. Diodes 50 and 51 are rectifier tubes having their cathodes connected to the grids 32 and 42 of tubes 30 and 40 and their plates connected to the common grid pulse line. These diodes prevent negative pulses which originate in the count signal generator from reaching the grids of the gas tubes 30 nad 40 to prevent the premature extinguishment of these tubes.

Ignoring the shunting effects of resistances 36, 38, and 39', we find by simple calculation that the cathode of tube 30 is at a potential of 72 volts positive with respect to ground, and the plates 31 and 41 of tubes 30 and 40 are 81 volts positive with respect to ground. At this time, the screen 41 of tube 40 is approximately 9 volts positive with respect to ground while its grid 42 is 30 volts negative with respect to ground. With these potentials on tube 40, it cannot fire until a sufficiently positive signal is applied to its grid 42 (grid 42 must be driven to about 4 volts negative or higher to fire the tube).

The screen of the tube following tube 40 (#3 tube of ring counter) (not shown in Figure 2) is at a potential of 40 volts negative with respect to ground. With this potential on its screen, this latter tube cannot be fired with a normal signal on its grid. Now suppose a sharp positive pulse of short duration is applied to all the tube grids simultaneously. Tube 30, already being fired, cannot, of course, be fired. The tube following tube 40 with screen negative 40 volts cannot fire. Tube 40, however, will fire.

At the first instant of firing, the capacitor 37 in the cathode circuit of tube 40 has practically no voltage across it (about 2.6 volts). This voltage cannot change until current has flown into it. This current can come only through resistance 34, tube 40, and resistance 44. At the first instant after the firing of tube 40, the first potential on the plates of all the tubes of the ring are now only about 38 volts positive with respect to ground. At this time, the capacitor 37 in the cathode circuit of tube 30 is charged to a potential very near to the potential at the cathode 33 of tube 30 which, in the sample circuit, is 72 volts. This means that the plate 31 of tube 30, at the first instant of the firing of tube 40, is driven approximately 34 volts negative with respect to its cathode 33, and conduction through tube 30 ceases.

The only requirement now is that the cathode of tube 30 be maintained at a nonconducting potential with respect to its cathode for a time equal to or longer than the deionization time of the tube, or longer than the duration of the positive grid signal, whichever is longer, to cause the tube 30 to be permanently extinguished.

By the use of proper RC time constants in the cathode circuits together with the proper common plate load resistor 34, the maximum practical operating capabilities are obtained.

Note that if the screen of the tube #3 (not shown) which is connected to the junction of resistors 48 and 49 went to its ultimate positive value while the grid signal thereof was still present, we would also fire the tube #3. This is prevented by introducing the delay in rise of voltage across capacitor 45 to the rise of voltage on the screen of tube #3 of the ring.

Normally, tube #zero (not shown) is always fired until an entry is made in a column, either directly or by carry over from the column of next lower order. Tube zero primes the screen of tube #1 so that it will fire from the next grid pulse. The #1 tube (tube 30) extinguishes tube #zero and primes the screen of tube #2 (tube 40). This follows on through, each grid pulse firing the tube of next higher order, until tube #9 of the ring counter 1 (not shown) fires. When tube #9 fires, it extinguishes tube #8 and primes the screen of tube #zero. Firing tube #zero completes the cycle for any particular counter column. As before, it extinguishes tube #9 and primes the screen of tube #1, etc. (It is at this point that carry over to the column of next higher order occurs.) Carry over will be discussed later.

Note that the number of tube fired corresponds to the digit of that particular column of figures in the total. That is, if tube #2 is fired in the tens column, it means that in the tens row of the total, the numeral two should appear, etc.

The grid signal from the count signal generator is applied to the separate grids of the ring counter through diodes such as to eliminate coupling from one grid to another.

*Count signal generator*

The function of the count signal generator 2 in each column is to supply a sharp pulse of short duration to operate the ring counter and other circuits to be described in detail later.

Figure 3:
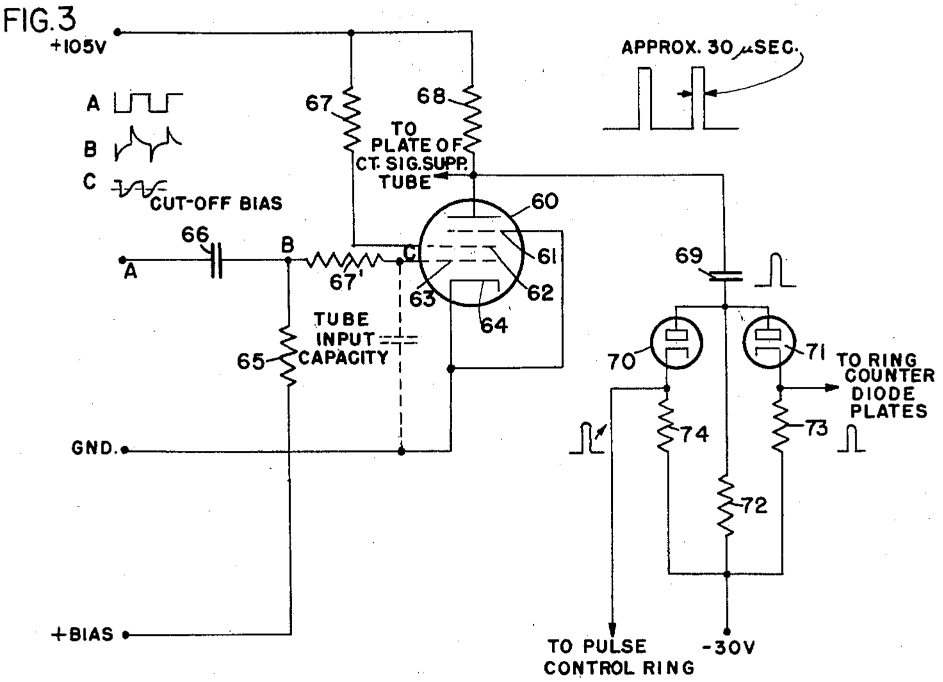
Figure 3 is an exemplary schematic diagram of the count signal generator shown in block form in Figure 1.

Figure 3 shows an exemplary circuit of such a generator.

The count signal generator may be a type 6AG7 tube 60 which is normally conducting with a slight positive bias applied to its grid 63 to prevent small transients from operating the tube. Under these conditions, the plate resistance 68 of the tube is so low that only about 18 to 20 volts drop appear across the tube, the remaining drop being across the 5000 ohm plate load resistor 68.

The grid 63 of this tube is coupled through a differentiating circuit ($R_{65}$, $C_{66}$), whose time constant may be 33 microseconds to square wave generator 5 shown in block form in Figure 1, which produces a square wave with a very steep wave front.

The charging time of the capacitor 66 is approximately 33 microseconds so a voltage is developed across resistance 65 which is substantially proportionate to the first derivative of the square wave giving a sharp pulse of voltage across it at the instant of change of the square wave voltage. The positive pulse developed in this manner causes little change in the plate current of the tube 60 and thus a very small output in the plate circuit. The negative pulse, however, drives the grid of tube 60 negative beyond plate current cut off, causing a positive signal of large amplitude to appear in the plate circuit of tube 60.

As this negative voltage disappears from resistance 65 as soon as the capacitor 60 becomes charged (roughly 2RC or 66 microseconds, the duration of the pulse in the plate circuit can be made as short as desired by adjustment of the positive bias effectively applied to the tube).

The approximate wave forms appearing at the points A, B, and C of Figure 3 are shown on Figure 3 just above capacitor 66.

Resistor 67 connected to control grid 63 of tube 60 serves three purposes, chiefly to limit grid current from tube 60. It also permits quite a wide range of effective positive bias adjustment and reduces loading of the square wave signal generator. The large size of this resistor 67 results in considerable "rounding off" of the sharp negative puless applied to the grid due to the input capacity of the tube. This "rounding off" of the signal proves to be an advantage as it determines the minimum width of the output pulse, leaving the adjustment of bias to be as simple a matter as adjustment to maximum height and sharpest definition. This adjustment is actually quite broad.

The positive pulse is coupled through capacitor 69 to the plates of two diodes 70 and 71, the cathode circuits of which feed separately the grid circuits of the ring counter 1 and the pulse control ring 6 through the diodes as shown in Figure 1 of the ring counter description.

The reason for the separation of the ring counter and the pulse control ring grid circuits is that the carry-over pulse from the preceding column must not be applied to the pulse control ring.

Resistor 72 connected to capacitor 69 and the plate diodes 70 and 71 are for the purpose of restoring normal charge on capacitor 69 after a signal pulse has disappeared. The time constant is made quite large (e.g., 1000 microseconds) but also the ratio of discharge to charge time is quite large so that a change in charge on capacitor 69 does not accumulate. Resistors 74 and 73, which are coupled to the cathodes of diodes 70 and 71, are for the purpose of returning the plates of the coupling diodes in the ring counter and pulse control ring to zero potential with respect to their cathodes during the time no signal is present.

Exemplary values for the elements shown in Figure 3 may be as follows:

| | | |
|---|---|---|
| R65 | ohms | 100,000 |
| R66 | mmf | 330 |
| R67′ | ohms | 500,000 |
| R67 | do | 2,000 |
| R68 | do | 5,000 |
| Tube 60 | Type | 6AG7 |
| Tubes 70, 71 | Type | 6AL5 |
| C69 | mf | .01 |
| R72 | ohms | 100,000 |
| R73 | do | 25,000 |
| R74 | do | 25,000 |

*Count signal suppressor*

Figure 4:
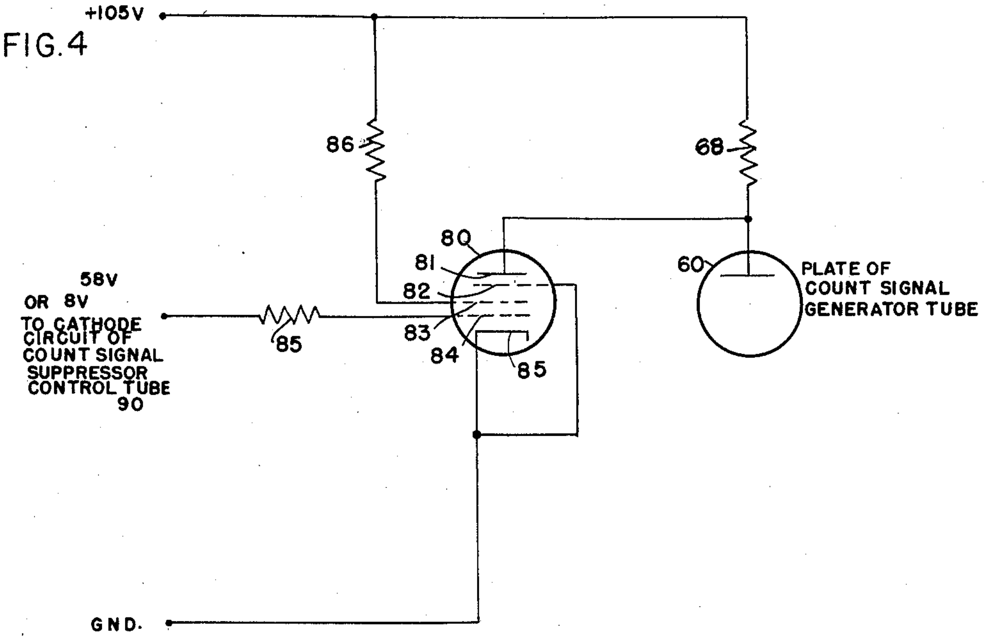
Figure 4 is an exemplary schematic diagram of the count signal suppressor shown in block form in Figure 1.

The function of the count signal suppressor is to prevent pulses from the count signal generator from reaching the ring counter, etc., except at the desired time and in the desired number. Figure 4 shows the schematic of one exemplary embodiment of this circuit.

The count signal suppressor may be a type 6AG7 pentode tube 80 whose plate 81 is tied directly to the plate of the count signal generator tube 60. The control grid 84 of this is tied through resistor 85 to the cathode circuit of the count signal suppressor control tube 90 (see Figure 5) to be described later. The control tube 90 is normally fired, and point "A," Figure 3, may be then maintained at approximately 59 volts positive with respect to ground. Under this condition, the suppressor tube 80 is conducting in parallel with the count signal generator tube 60.

During the time that the generator tube 60 is cut off by the signal from the square wave generator 5 (Figure 11), the suppressor tube 80 is still conducting resulting in negligible output from the plate of the generator tube 60. Should the control tube 90 (Figure 5), however, be extinguished, the grid of the suppressor tube 80 is driven approximately 8 volts negative (well beyond plate current cut off), and the generator tube 60 is permitted to operate.

The values of the circuit elements which may be used with the circuit of Figure 4 are as follows:

| | | |
|---|---|---|
| R85 | ohms | 500,000 |
| R86 | do | 2,000 |
| Tube 80 | Type | 6AG7 |

*Count signal suppressor control*

Figure 5:
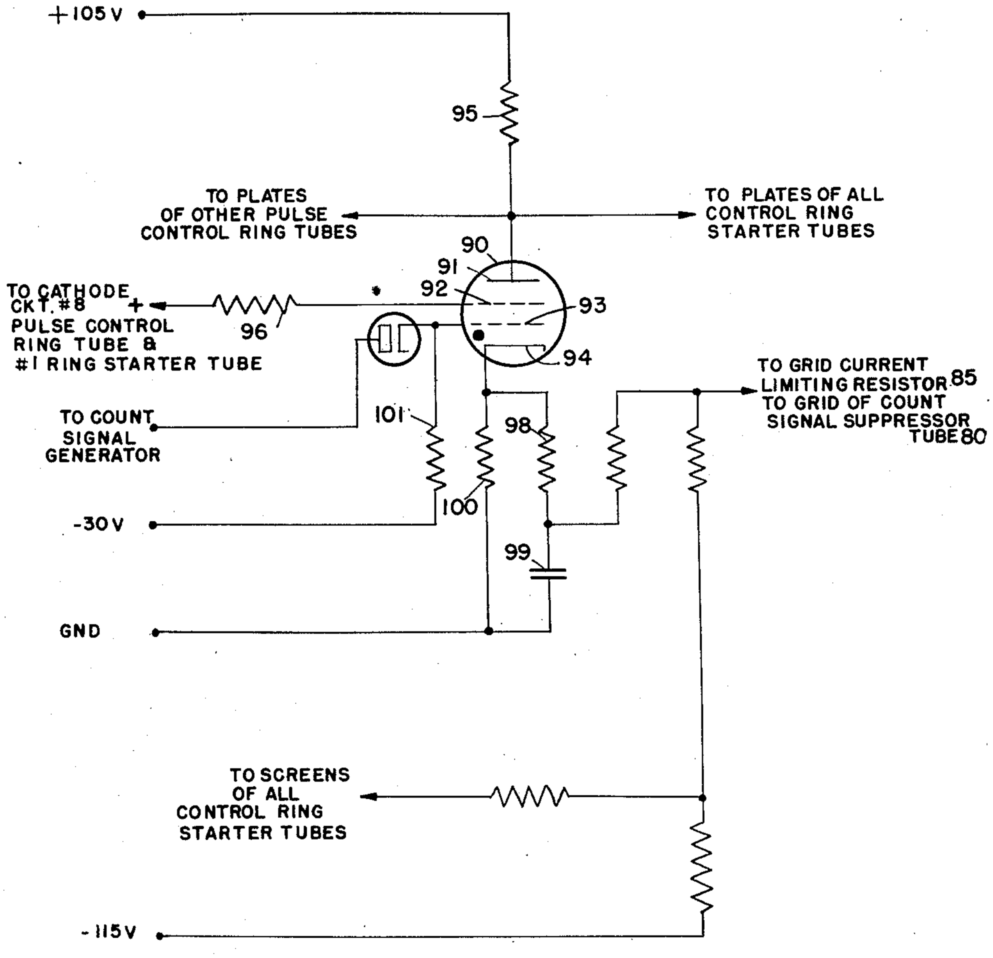
Figure 5 is an exemplary schematic diagram of the count signal suppressor control circuit shown in block form in Figure 1.

The function of the count signal suppressor control tube 90 is to control the action of the count signal suppressor just described. The circuit exemplary therefor is shown in Figure 5.

The suppressor control tube 90 may be a type 2D21 gas tetrode and is normally fired. In reality, it is the #9 tube of the pulse control ring 6 (Figure 1) which is fired by the count signal generator 2 only after pulse control ring tube #8 or control ring starter tube #1 is fired.

Firing any one of the control ring starter tubes extinguishes the control tube 90. The method of extinguishing tubes by firing others is described briefly in the description of the ring counter and is thought unnecessary to describe, especially since this technique is well known in the art.

Extinguishing the control tube 90 causes the screens of the control ring starter tubes to be driven negative to about minus 40 volts, preventing any of them from being fired or refired until the control tube is again fired.

The grid of the count signal suppressor tube also is driven to about 9 volts negative with respect to ground, cutting off plate current, and permitting the count signal generator to operate.

As soon as the count signal generator starts operating, pulses are sent to the ring counter, the pulse control ring (including the count signal suppressor control), and the carry-over detector (to be described later).

Unless the pulse control ring tube #8 or the control ring starter tube #1 is fired, the screen of the suppressor control tube is held negative so that the grid signal cannot fire the tube. As soon as either of those two tubes are fired, however, the next signal from the count signal generator will fire the suppressor control tube 90. Firing the suppressor tube 90 extinguishes whichever of the previously mentioned two tubes was fired and primes the screens of all the control ring starter tubes, so that any one of them can be fired.

The grid of the count signal suppressor tube is also driven positive, preventing further signals from the count signal generator.

The circuit elements used with Figure 5 may be as follows:

| | | |
|---|---|---|
| Tube 90 | Type | 2021 |
| R95 | ohms | 5,000 |
| R96 | do | 100,000 |
| R98 | do | 2,500 |
| C99 | mf | .01 |
| R100 | ohms | 15,000 |
| R101 | do | 250,000 |

*Pulse control ring*

The function of the pulse control ring is to provide a means of counting the pulses delivered to the ring counter for an entry in a particular column.

Reference is now made to Figure 6 which shows the schematic diagram of one exemplary embodiment of the pulse control ring 8 as well as the complete schematic of the pulse control ring 6 and suppressor control 7, parts of which were described in connection with Figure 5.

Reference to the description of the ring counter will describe the principle of operation of the pulse control ring, identical but for certain exceptions which will be noted and described herein. Suffice it to say that the pulse control rings 6 and 7 consist of nine stages, #1 to #9, each including a gas tube which, when fired, primes the next higher state for the adding operation (the reverse holds for subtraction). The count signals are applied commonly to the control grids of each gas tube.

As previously stated, the count signal suppressor control tube 90 is also pulse control ring tube #9 and is normally conducting except during the time a direct entry (not a carry-over entry) is being made in that particular column.

The chief difference between the pulse control ring 6 and the ring counter 1 is that the last tube of the ring (#9 or suppressor control tube) does not prime the screen of the first tube of the ring (#1), so that the ring can continue operating so long as pulses are delivered by the count signal generator.

The cycle of operation can consist of as few as one and no more than nine pulses, depending upon which tube of the ring starts the cycle.

As stated in a previous discussion, the #1 tube is extinguished by firing the desired control ring starter tube by applying a pulse by any suitable means along one of the conductors 115–119 and 125–127 to the grids of the associated tubes. This permits the count signal generator to operate, and the first pulse from it will fire the tube in the pulse control ring whose screen is primed by the control ring starter tube which is fired. The next pulse, if any, fires the control ring tube of the next higher number, and this action continues simultaneously with and in exactly the same manner as the ring counter until control ring tube #1 is fired, at which time the count signal suppressor prevents further pulses from the count signal generator, and action ceases.

In order to enter a number in a column, we first extinguish the count signal suppressor control tube 90 and prepare the screen of the pulse control ring of the same number as the number to be entered in the column.

That number of pulses are then required to refire the suppressor control tube; and as the ring counter advances one position for each pulse, we effectively add that number to that column in the total.

*Control ring starter tubes*

The function of the control ring starter tubes 8 is to select the proper tube of the pulse control ring with which to start the entry cycle, and thus determine the number to be added to the column. It also extinguishes the count signal suppressor control tube.

The control ring starter tubes 110, 120, 130, 140, 150, 160, 170, 180, and 190 are nine in number and are also numbered in the drawings from 1 through 9 in accordance with the number which they will cause to be entered into the column. They may be gas tetrodes, none of which are normally conducting. Their plates 111, 121, 131, 141, 151, 161, 171, 181, and 191 are all tied as by conductor 196 to the plates of all the pulse control ring tubes and have a common plate load resistance 214. Their screws 112 through 192 are all tied together and through a large resistor 200 to the cathode network of the #9 control ring tube 90.

The cathode 114 of the #1 starter tube 110 is tied to the cathode 201 of the #8 control ring tube, #2 to #7, etc., including the #8 starter tube cathode 194 to the #1 starter tube cathode 202. The firing of one of the starter tubes 110–190 causes a positive voltage to appear in the cathode circuit of the associated tube. This positive voltage is coupled to the screen grid of the next higher tube in the control ring through coupling impedances, such as resistance 205 in control ring stage #1, so as to prime the tube in a manner previously described in connection with the ring counter circuit 1 shown in part in Figure 2.

The #9 starter tube 190 is unique in that it has its own cathode load and filter circuit 199 exactly similar to that of the ring counter tubes, such as 30 and 40 of Figure 2. This separate cathode network is necessary, because there are no more control ring tubes to which its cathode may be connected. However, firing it extinguishes the #9 control ring tube 90 and primes the screen of the control ring tubes 203 by its connection with screen 204 of tube 203 in the same manner as tube 30 in Figure 2 primes tube 40 there shown.

The proper starter tube is fired by applying a sharp positive pulse to the grid of the appropriate tube when the #9 control ring tube 90 is in the fired condition. The screens of all the starter tubes 110–190 are coupled to the cathode of the #9 control ring tube 90 through resistances 200, 210, and 211. The screens of these tubes are primed by the positive voltage built up across capacitor 212 when the #9 control ring tube 90 is in the conductive or fired state. The firing of any of the starter tubes extinguishes the #9 control ring tube 90, however, as the plate voltage thereof is suddenly lowered by the increased voltage drop across common plate load resistor 214 due to the conduction of one of the starter tubes. When the #9 control tube is extinguished, the grids of the starter tubes are no longer primed because the positive priming voltage in the cathode circuit of #9 control tube disappears with the stoppage of tube conduction. The subsequent firing of one of the control ring tubes extinguishes the previously fired starter tube due to the sudden consequent drop of plate voltage thereof since it is tied to common plate load resistance 214.

*Carry-over detector*

The function of the carry-over detector is to detect, in a column, the conditions under which carry over to the column(s) of the next higher order should occur. Reference should be made to Figure 7 for an exemplary circuit diagram of the carry-over circuits.

The carry-over detector may be a gas tetrode which is normally not conducting. Its grid 302 receives a signal from the count signal generator via conductor 303 and diode 304 exactly similar to, and at the same time as, the pulse control ring of that particular column. Its grid is excited by diode 304 whose plate is tied directly to line 305 that supplies the signal to the pulse control ring tube grids. Also its grid can receive a pulse from the multiple carry-over signal generator of the column of the next lower order. This happens when carry over occurs in this lower order column. Its screen 301, however, is controlled by the cathode circuit of either the #9 or #0 (depending upon whether adding or subtracting) ring counter tube. If adding, the carry-over detector 15 cannot be fired unless the #9 ring counter tube is fired. If subtracting, it can be fired only if the #0 ring counter tube is fired. For the present discussion, addition will be assumed unless specifically stated otherwise.

Its cathode circuit has a quench circuit 315 including resistances 307 and 309 and capacitor 308 exactly like most of the tubes of the ring counter previously explained and performs the function also of preventing more than one pulse from the multiple carry-over signal generator (to be described later).

The plate 310 is tied directly to the plate of the carry-over signal suppressor control gas tube 311, and these plates are tied to a positive voltage through a common plate load resistor 312.

As will be seen later, the carry-over signal suppressor control tube 311 also has a quenching filter 313 in its cathode circuit and is normally conducting.

Due to the common plate load resistor 312 and the cathode quenching circuits 313 and 313', firing either tube will extinguish the other in a manner similar to that described in connection with the counter ring circuit of Figure 2. As a matter of fact, the primary function of the carry-over detector 15 is to extinguish the carry-over signal suppressor control tube.

Also the sharp quenching pulse in the common plate circuit of these two tubes, when firing the carry-over detector, is used to operate the multiple carry-over signal generator 16. A conductor 319 couples the plate 310 of detector tube 300 to the grid 317 of the multiple carry-over signal 316. After the carry-over detector 15 is once fired, however, its cathode is positive with respect to ground and a diode 315 coupling this potential to the grid 317 of the tube 316 (over conductor 319) of the multiple carry-over signal generator 16 prevents the sharp quenching pulse which is also fed to grid 317 of tube 316, occurring when the carry-over signal suppressor control tube 311 is refired from operating the tube 316 of the multiple carry-over signal generator 16. When the carry-over detector 300 first fires, capacitor 308 has been discharged to zero, so that diode 315 connected between capacitor 308 and conductor 319 is nonconductive. The voltage pulse on conductor 319 originating from the plate 310 of detector tube 300 as it fires is coupled to the grid of multiple carry-over generator tube 316 to operate same. When the carry-over detector is extinguished by the firing of control tube 311 in response to a pulse from the carry-over signal generator 11, the resultant pulse occurring in the common plate circuit of the detector and control tubes 311 is effectively squelched, because diode 315 is conductive due to the positive voltage built up across condenser 308 which cannot be discharged instantaneously.

As stated before, when the carry-over signal suppressor control tube 311 is refired, the carry-over detector tube 300 is extinguished and cannot be refired until its screen is again primed by the proper ring counter tube.

*Carry-over signal suppressor*

The function of the carry-over suppressor 13 is to prevent pulses from the carry-over signal generator 12 from reaching the ring counter of the next higher order except at a time carry over should occur.

The operation of the carry-over suppressor 13 is identical to that of the count signal suppressor 3, and reference to the description of that unit should be made for particulars on the principle of operation.

The only difference in the two units is that the carry-over suppressor 13 suppresses the carry-over signal and is controlled by the carry-over signal suppressor control 14 while the counter signal suppressor 3 suppresses the count signal and is controlled by the count signal suppressor control 7.

*Carry-over signal suppressor control*

The chief function of the carry-over signal suppressor control tube 311 is, as its title implies, to control the carry-over signal suppressor 13. Its one other function is to extinguish the carry-over detector 13 once it has been fired.

The grids of the carry-over signal suppressor control tubes of all the columns are fed a continuous signal from a common source, the carry-over suppressor control signal generator 12. This signal is a short sharp pulse in exact time phase with, and similar in wave form and amplitude to, the signal supplied by the count signal generators to the ring counters, etc. It can be seen from the above that the carry-over signal suppressor control tube 311 cannot remain extinguished longer than one cycle of the signal from the square wave generator. Once the tube is fired, of course, the continuous grid signals can have no effect on the tube.

The carry-over signal suppressor control tube 311 is normally conducting and keeps the carry-over signal suppressor 13 operative by feeding a positive voltage from its cathode circuit over conductor 320 to the grid of gas tube 321 in the carry-over suppressor circuit 13. This prevents carry-over signals from being sent to the column of the next higher order since the plate circuits of suppressor tube 321 and the plate of tube 322 of the carry-over signal generator 12 have a common plate load resistance 323. Conduction of suppressor tube 321 lowers the plate voltage of carry-over generator tube 322 so that the output thereof is negligible.

When the carry-over detector 15 is fired, however, the carry-over control tube 311 is extinguished, driving the grid of the carry-over signal suppressor control tube 311 negative to plate current cut off, permitting the carry-over signal generator 12 to operate from a square wave 180° out of phase with that supplied the grids of the count signal generators as previously explained. This square wave is supplied by the square wave signal generator 5 shown in block form in Figure 1. The sharp quenching pulse at the plate 310 of the carry-over detector tube 3 or is fed to the grid of the multiple carry-over tube 316 and causes the multiple carry-over signal generator to send out a pulse to the carry-over detector of the column of the next higher order for reasons previously explained.

Before the next grid pulse arrives at the grid of the carry-over control tube, the carry-over signal generator 12 sends a pulse to the ring counter of the column of the next higher order, advancing it one step as it receives a pulse derived from the square wave fed thereto from square wave generator 5 on conductor 330. One-half cycle of the main timing pulse later, the signal from the carry-over suppressor control signal generator 11 fed thereto over conductor 331 refires the carry-over control tube 311. It should be remembered that pulses are sent to the control tube 311 and the carry-over signal generator tube 12 180° out of phase circuit to the grid of suppressor tube 321 via conductor 320.

When the carry-over control tube 311 refires, it extinguishes the carry-over detector tube 300 and again drives the grid of the carry-over signal suppressor tube 321 by the connection of its cathode preventing further carry-over signals. Also, another sharp quenching pulse is developed at the plate of tubes 300 and 311 as the detector tube 300 is extinguished, but as the carry-over detector is fired at this instant, the multiple carry-over signal generator does not operate for reasons previously explained.

The carry-over signal suppressor control tube 311 now remains fired until again extinguished by the carry-over detector. At this time, the above described cycle is repeated.

*Multiple carry-over signal generator*

The multiple carry-over signal generator 16 operates exactly like the count signal and the carry-over generators in that it includes a tube 316 normally conducting which is driven to cut off by a sharp negative pulse which results in a sharp positive pulse in its plate circuit. It operates when the carry-over detector 15 operates; and a few microseconds after the carry-over detector tube 300 fires, its grid is held positive by the cathode circuit potential of the carry-over detector, so that it cannot operate when the carry-over suppressor control is fired.

When the carry-out suppressor control tube 311 is fired, the carry-over detector is extinguished; and a few microseconds later (after the plate circuit signal has disappeared), this suppressor voltage to the grid of the multiple carry-over signal generator disappears, so that the multiple carry-over signal generator can operate the next time the carry-over detector is fired.

*Carry-over signal generator*

The function of the carry-over signal generator 12 is to supply a signal similar to the count pulse to the column of the next higher order one-half cycle of the main timing pulse after the #0 ring counter tube has been fired.

Electrically the carry-over signal generator is exactly similar to the count signal generator in principle of operation. Its grid 331 of generator tube 322 is fed a continuous signal that is 180° (electrical) out of phase with that supplied the count signal generator so that its plate circuit pulses are spaced in time relation half way between any count signals that might be existant. The purpose of the above timing is to prevent the function of carry-over from interfering with normal entries in a column as previously explained.

The plate circuit pulse feeds the ring counter only of the next higher order column. As previously explained, its signal does not advance the pulse control ring of the next higher order column.

It should be understood that many modifications may be made of the specific embodiment of the invention above disclosed without deviating from the broad, generic aspect thereof.

The invention described herein may be manufactured and used by or for the Government of the United States of America for governmental purposes without payment of any royalties thereon or therefor.

We claim:

1. An electrical accumulator comprising a pulse counter for each denomination or order of numerical data, respective pulse generator means associated with said pulse counters for feeding a preselected number of count pulses to said counters representing the number to be accumulated in each denomination, respective carry-over detector means coupled to said pulse counters and to the associated pulse generator means and adapted to be primed by the associated pulse counter when it accumulates its maximum count so that it becomes operative upon receiving a pulse, respective carry-over pulse generator means associated with said carry-over detector means adapted to deliver carry-over pulses which are out of phase with the corresponding count pulses to the pulse counter of the next higher denomination, respective carry-over generator control means coupled between said carry-over detector means and the associated carry-over pulse generator means for causing the associated carry-over pulse generator means to deliver a single carry-over pulse when the associated carry-over detector means is rendered operative, and respective additional carry-over pulse generators associated with said carry-over detector means and each adapted to deliver a pulse to the carry-over detector means of the next higher denomination to render it operative when the carry-over detector means of its denomination is rendered operative.

2. An electrical accumulator comprising a time base generator means for generating a first and second group of pulses of a given pulse repetition rate, said pulse groups being out of phase, a pluarlity of pulse accumulating channels each representing a given order or denomination of numerical data and each including a main pulse ring counter and a pulse control counter having a counting range of X pulses and $(X-1)$ pulses respectively, a suppressor means coupled between the output terminal of said time base generator delivering said first group of pulses and the input of said main ring pulse counter and responsive to the maximum $(X-1)$ count condition of said pulse control counter to prevent pulses from said time base generator from reaching said main ring counter, means coupling the group of pulses fed to said main ring counter to the input of said pulse control counter, means for initially setting a predetermined count in said pulse control counter equal to $(X-1)$ minus the number to be accumulated, and means for rendering said count pulse suppressor means inoperative to initiate a new counting cycle.

3. The combination of claim 2 characterized further by each of said pulse accumulating channels also including pulse carry-over circuits comprising a carry-over detector coupled to said main ring counter which is primed for operation by a count or carry-over pulse when a maximum count of X is accumulated in said main pulse counter, means including carry-over pulse generator means coupled between the output terminals of said time base generator delivering said second group of pulses and the input of the main pulse counter of an adjacent order responsive to operation of said carry-over detector to transfer a pulse to the said input of the main pulse counter of the adjacent order, a multiple carry-over pulse generator coupled between said carry-over detector and the carry-over detector of an adjacent order to operate said latter detector if primed by the associated main pulse counter when said former detector is rendered operative, and means coupling the same count pulses fed to said main ring counter to said former carry-over detector to operate same when in a primed condition.

References Cited in the file of this patent

UNITED STATES PATENTS

| | | |
|---|---|---|
| 2,402,989 | Dickinson | July 2, 1946 |
| 2,403,873 | Mumma | July 9, 1946 |
| 2,484,115 | Palmer et al. | Oct. 11, 1949 |
| 2,626,752 | Williams | Jan. 27, 1953 |
| 2,703,678 | Hopkins et al. | Mar. 8, 1955 |
| 2,706,597 | Crosman | Apr. 19, 1955 |